(12) United States Patent
Lee (10) Patent No.: US 8,885,570 B2
(45) Date of Patent: Nov. 11, 2014

(54) SCHEMES FOR PROVIDING PRIVATE WIRELESS NETWORK

(75) Inventor: Hyoung-Gon Lee, Seoul (KR)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 13/995,840

(22) PCT Filed: Jul. 11, 2012

(86) PCT No.: PCT/KR2012/005487
§ 371 (c)(1),
(2), (4) Date: Jun. 19, 2013

(87) PCT Pub. No.: WO2014/010762
PCT Pub. Date: Jan. 16, 2014

(65) Prior Publication Data
US 2014/0010224 A1    Jan. 9, 2014

(51) Int. Cl.
*H04W 4/00* (2009.01)
*H04W 84/12* (2009.01)
*H04W 80/04* (2009.01)

(52) U.S. Cl.
CPC .............. *H04W 84/12* (2013.01); *H04W 80/04* (2013.01)
USPC ............ 370/328; 370/338; 370/401; 455/440

(58) Field of Classification Search
None
See application file for complete search history.

(56) References Cited

U.S. PATENT DOCUMENTS

| | | | | |
|---|---|---|---|---|
| 6,968,194 B2 * | 11/2005 | Aljadeff et al. | ............ | 455/456.1 |
| 7,574,202 B1 * | 8/2009 | Tsao et al. | .................... | 455/411 |
| 2003/0058808 A1 * | 3/2003 | Eaton et al. | .................... | 370/310 |
| 2005/0026650 A1 | 2/2005 | Russell | | |
| 2005/0036476 A1 * | 2/2005 | Eaton et al. | .................... | 370/349 |
| 2006/0227972 A1 * | 10/2006 | Brok et al. | .................... | 380/270 |
| 2007/0049293 A1 | 3/2007 | Russell | | |
| 2007/0060133 A1 | 3/2007 | Spitzer | | |
| 2007/0258421 A1 * | 11/2007 | Alizadeh-Shabdiz et al. | ............................ | 370/338 |
| 2008/0108371 A1 * | 5/2008 | Alizadeh-Shabdiz et al. | ............................ | 455/456.1 |
| 2008/0161011 A1 * | 7/2008 | Babin et al. | ................ | 455/456.1 |
| 2009/0154371 A1 * | 6/2009 | Alizadeh-Shabdiz et al. | ............................ | 370/252 |
| 2009/0175189 A1 * | 7/2009 | Alizadeh-Shabdiz et al. | ............................ | 370/252 |
| 2009/0287798 A1 * | 11/2009 | Law et al. | .................... | 709/220 |
| 2010/0182959 A1 | 7/2010 | Cook et al. | | |
| 2011/0080841 A1 * | 4/2011 | Alizadeh-Shabdiz et al. | ............................ | 370/252 |
| 2011/0154454 A1 | 6/2011 | Frelechoux | | |

(Continued)

FOREIGN PATENT DOCUMENTS

| | | |
|---|---|---|
| EP | 2337312 A1 | 6/2011 |
| KR | 10-2007-0038927 A | 4/2007 |

OTHER PUBLICATIONS

International Search Report from International Application No. PCT/KR2012/005487 mailed Mar. 28, 2013.

(Continued)

*Primary Examiner* — Bob Phunkulh
(74) *Attorney, Agent, or Firm* — Brundidge & Stanger, P.C.

(57) ABSTRACT

Technologies are generally described for providing private wireless local area networks. In some examples, a method performed under control of a mobile operating server may include determining a first location of an end device, determining a first access point configured to provide a wireless local area network around the first location of the end device and instructing the first access point to provide the end device with a first private wireless local area network.

23 Claims, 5 Drawing Sheets

(56) References Cited

U.S. PATENT DOCUMENTS

| | | | |
|---|---|---|---|
| 2011/0287783 A1* | 11/2011 | Alizadeh-Shabdiz et al. | 455/456.1 |
| 2012/0100872 A1* | 4/2012 | Alizadeh-Shabdiz et al. | 455/456.1 |
| 2012/0178477 A1* | 7/2012 | Morgan et al. | 455/456.6 |
| 2012/0196621 A1* | 8/2012 | Alizadeh-Shabdiz et al. | 455/456.1 |
| 2012/0238287 A1* | 9/2012 | Scherzer | 455/456.1 |
| 2013/0115945 A1* | 5/2013 | Holostov et al. | 455/434 |

OTHER PUBLICATIONS

3G/Wi-Fi Seamless Offload, Qualcom Incorporated, Mar. 2010, 11 pages.

* cited by examiner

SCHEMES FOR PROVIDING PRIVATE WIRELESS NETWORK

BACKGROUND ART

It is generally preferable to use wireless local area networks (WLAN) for data transmission because the wireless local area networks (WLAN) are typically available at lower cost but with higher throughput than mobile networks. However, security for the wireless local area networks (WLAN) has drawn intense scrutiny.

DISCLOSURE OF INVENTION

Solution to Problem

In an example, a method performed under control of a mobile operating server may include determining a first location of an end device, determining a first access point configured to provide a wireless local area network around the first location of the end device and instructing the first access point to provide the end device with a first private wireless local area network.

In an example, a mobile operating server may include a locating unit configured to determine a first location of an end device, an access point determination unit configured to determine a first access point configured to provide a wireless local area network around the first access point of the end device and an access point control unit configured to instruct the first access point to provide the end device with a first private wireless local area network.

In an example, a computer-readable storage medium may store thereon computer-executable instructions that, in response to execution, cause a mobile operating server to perform operations including determining a first location of an end device, determining a first access point configured to provide a wireless local area network around the first location of the end device and instructing the first access point to provide the end device with a first private wireless local area network.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

MODE FOR THE INVENTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatuses, systems, devices, and computer program products related to schemes for providing private wireless networks. Technologies are generally described for a method for providing private wireless local area networks with enhanced security.

Figure 1A:
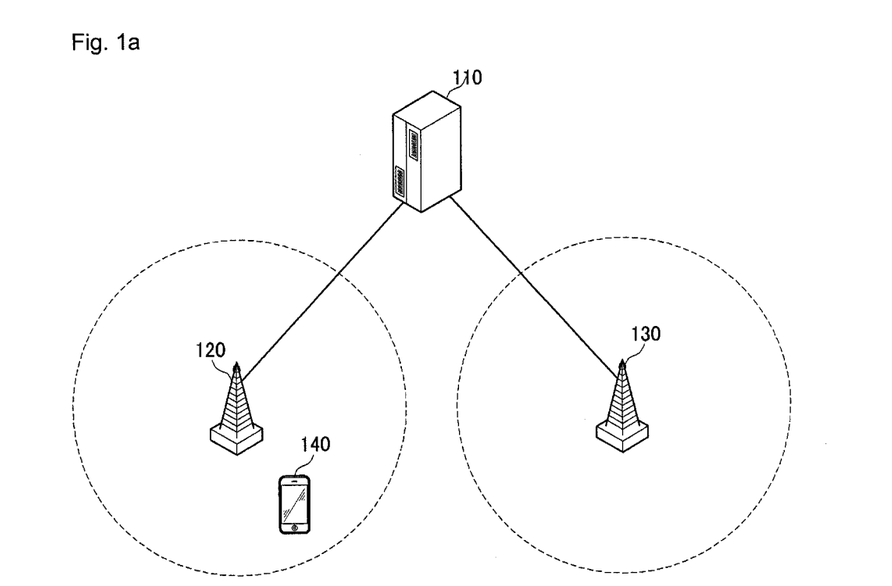
FIGS. 1A and 1B schematically show illustrative examples of network communications environments including a mobile operating server, at least one access point and an end device, arranged in accordance with at least some embodiments described herein.
Figure 1B:
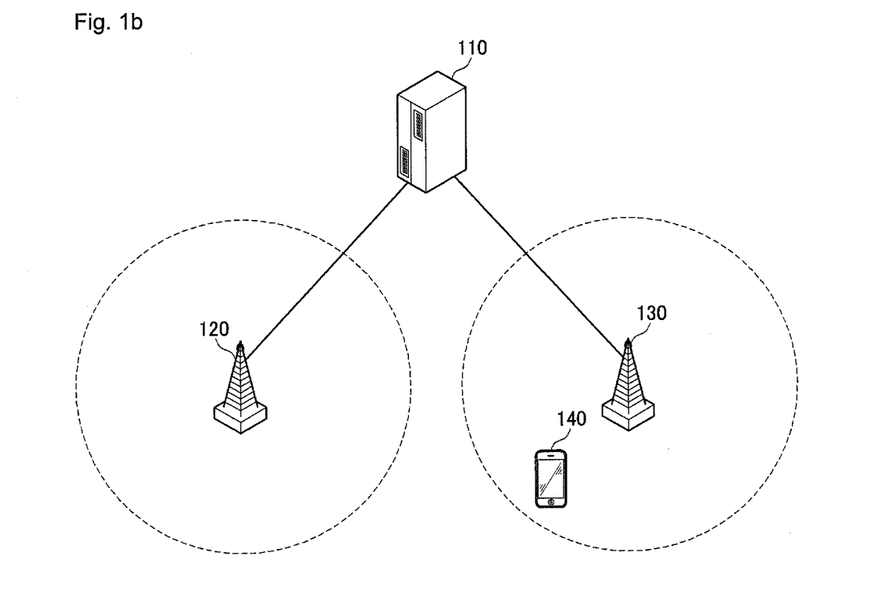

FIGS. 1A and 1B schematically show illustrative examples of network communications environments including a mobile operating server, at least one access point and an end device, arranged in accordance with at least some embodiments described herein.

As illustrated in FIG. 1A, there may be a mobile operating server 110, a first access point 120 and a second access point 130. Mobile operating server 110 may control first access point 120 and second access point 130, respectively. Mobile operating server 110 may determine a location of an end device 140. By way of example, but not limitation, mobile operating server 110 may determine a location of end device 140 by detecting global positioning system (GPS) information of end device 140 or using a 3G/4G network's position locating method.

Mobile operating server 110 may determine an access point to provide end device 140 with a wireless local area network around the location of end device 140. In some embodiments, mobile operating server 110 may determine first access point 120 to provide end device 140 with the wireless local area network.

Mobile operating server 110 may instruct the access point around the location of end device 140 to provide end device 140 with a private wireless local area network. In some embodiments, mobile operating server 110 may instruct first access point 120 to provide end device 140 with a first private wireless local area network. Then, first access point 120 may provide end device 140 with the first private wireless local area network on the receipt of the instruction generated by mobile operating server 110. By way of example, but not limitation, first access point 120 may assign some bandwidths of the wireless local area network as the first private wireless local area network for end device 140.

Mobile operating server 110 may instruct end device 140 to connect to the first private wireless local area network provided by first access point 120. End device 140 may include information for connecting to the first private wireless local area network provided by first access point 120.

The private wireless local area network may have a network identifier such as a unique service set identifier (SSID). In some embodiments, mobile operating server 110 may provide the first private wireless local area network with a unique SSID. The unique SSID of the first private wireless local area network may be provided to end device 140. By way of example, but not as a limitation, the unique SSID may be displayed on a display of end device 140, and a user of end device 140 may select the unique SSID and input a password to connect to the first private wireless local area network. As another example, but not as a limitation, end device 140 may have the unique SSID and a private password or a secured key for the first private wireless local area network and automatically connect to the first private wireless local area network.

As illustrated in FIG. 1B, when end device 140 moves out from a network area of first access point 120, mobile operating server 110 may instruct first access point 120 to terminate the first private wireless local area network. Then, mobile operating server 110 may repeat to determine the location of end device 140. Mobile operating server 110 may determine another access point to provide end device 140 with a wireless local area network. In some embodiments, mobile operating server 110 may determine second access point 130 to provide end device 140 with the wireless local area network.

Mobile operating server 110 may instruct the other access point around end device 140 to provide end device 140 with another private wireless local area network. In some embodiments, mobile operating server 110 may instruct second access point 130 to provide end device 140 with a second private wireless local area network. Then, second access point 130 may provide end device 140 with the second private wireless local area network on the receipt of the instruction generated by mobile operating server 110. By way of example, but not limitation, second access point 130 may assign some bandwidths of the wireless local area network as the second private wireless local area network for end device 140.

Mobile operating server 110 may instruct end device 140 to connect to the second private wireless local area network provided by second access point 130. End device 140 may include information for connecting to the second private wireless local area network provided by second access point 130.

In some embodiments, mobile operating server 110 may provide the second private wireless local area network with a network identifier such as a unique SSID. The unique SSID of the second private wireless local area network may be same with that of the first private wireless local area network. The unique SSID of the second private wireless local area network may be provided to end device 140. By way of example, but not as a limitation, the unique SSID may be displayed on a display of end device 140, and a user of end device 140 may select the unique SSID and input a password to connect to the second private wireless local area network. As another example, but not as a limitation, end device 140 may have the unique SSID and a private password or a secured key for the second private wireless local area network and automatically connect to the second private wireless local area network.

In some embodiments, first access point 120 and second access point 130 may include a Wi-Fi access point, respectively. Further, the wireless local area networks provided by first access point 120 and second access point 130 may include a Wi-Fi network, respectively. Furthermore, the first private wireless local area network and the second private wireless local area network may include a Wi-Fi network, respectively.

In some embodiments, mobile operating server 110 may provide end device 140 with a private wireless local area network on the basis of not only the location of end device 140 but also other factors. By way of example, but not limitation, mobile operating server 110 may measure a duration time for which end device 140 is located around an access point (i.e., first access point 120 or second access point 130). If the measured duration time is shorter than a predetermined time, mobile operating server 110 may recognize that end device 140 is not located around the access point and may not instruct the access point to provide end device 140 with the private wireless local area network. Further, mobile operating server 110 may measure a speed at which end device 140 moves around the access point (i.e., first access point 120 or second access point 130). If the measured speed is faster than a predetermined speed, mobile operating server 110 may not instruct the access point to provide end device 140 with the private wireless local area network.

In FIGS. 1A and 1B, although there are two access points (i.e., first access point 120 or second access point 130) around end device 140, the number of access points may be modified in various ways. By way of example, but not limitation, when end device 140 moves out from a network area provided by second access point 130 and locates in another network area provided by another access point, mobile operating server 110 may instruct second access point 130 to terminate the second private wireless local area network. Then, mobile operating server 110 may instruct the other access point around end device 140 to provide end device 140 with another private wireless local area network.

Figure 2:
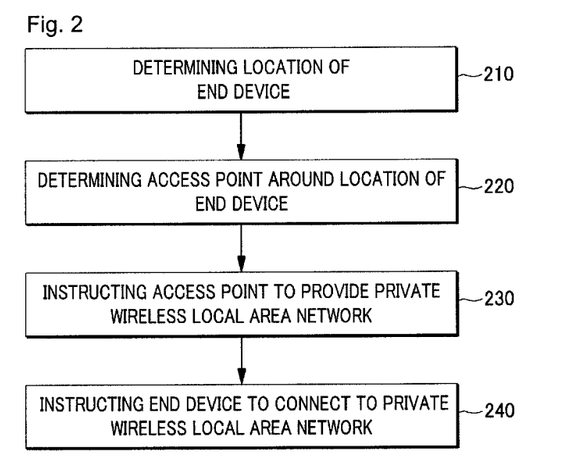
FIG. 2 shows an example flow diagram of a process of a mobile operating server for providing an end device with a private wireless local area network, arranged in accordance with at least some embodiments described herein.

FIG. 2 shows an example flow diagram of a process of a mobile operating server for providing an end device with a private wireless local area network, arranged in accordance with at least some embodiments described herein. The method in FIG. 2 may be implemented in the network communication environments including mobile operating server 110, at least one of first access point 120 and second access point 130, and end device 140, as illustrated in FIGS. 1A and 1B. An example process may include one or more operations, actions, or functions as illustrated by one or more blocks 210, 220, 230 and/or 240. Although illustrated as discrete blocks, various blocks may be divided into additional blocks, combined into fewer blocks, or eliminated, depending on the desired implementation. Processing may begin at block 210.

At block 210, mobile operating server 110 may determine a location of end device 140. By way of example, but not limitation, mobile operating server 110 may determine the location of end device 140 by detecting global positioning system (GPS) information of end device 140 or using a 3G/4G network's position locating method. Processing may proceed to block 220.

At block 220, mobile operating server 110 may determine an access point (i.e., first access point 120 or second access point 130) to provide a wireless local area network around the location of end device 140. Processing may proceed to block 230.

At block 230, mobile operating server 110 may instruct the access point around the location of end device 140 to provide end device 140 with a private wireless local area network. Then, the access point may provide end device 140 with the private wireless local area network on the receipt of the instruction generated by mobile operating server 110. By way of example, but not limitation, the access point may assign some bandwidths of the wireless local area network as the private wireless local area network for end device 140.

In some embodiments, at block 230, mobile operating server 110 may also measure at least one of a duration time for which end device 140 is located around the access point and a speed at which end device 140 moves around the access point. Then, mobile operating server 110 may determine whether to instruct the access point to provide end device 140 with the private wireless local area network based on the measured duration time and/or the measured speed. Processing may proceed to block 240.

At block 240, mobile operating server 110 may instruct end device 140 to connect to the private wireless local area network provided by the access point at block 230. End device 140 may include information for connecting to the private wireless local area network provided by the access point. The private wireless local area network may have a network identifier such as a unique service set identifier (SSID). The unique SSID of the private wireless local area network may be provided to end device 140.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 3:
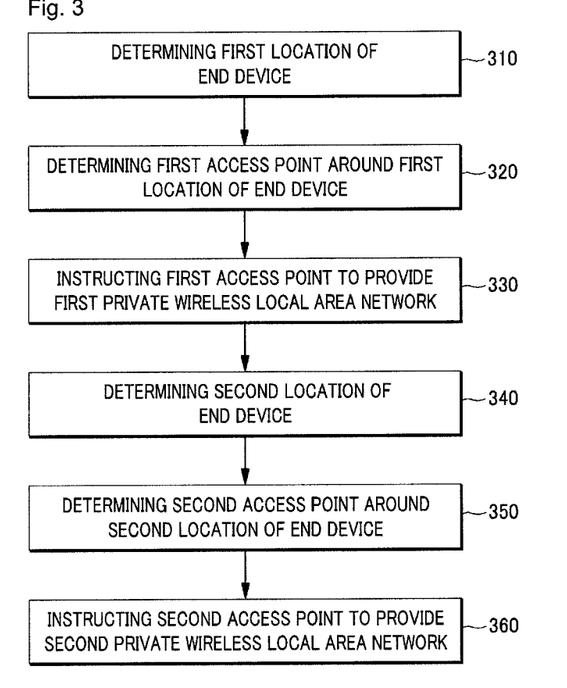
FIG. 3 shows another example flow diagram of a process of a mobile operating server for providing an end device with a private wireless local area network, arranged in accordance with at least some embodiments described herein.

FIG. 3 shows another example flow diagram of a process of a mobile operating server for providing an end device with a private wireless local area network, arranged in accordance with at least some embodiments described herein. The method in FIG. 3 may be implemented in the network communication environments including mobile operating server 110, first access point 120, second access point 130 and end device 140, as illustrated in FIGS. 1A and 1B. An example process may include one or more operations, actions, or functions as illustrated by one or more blocks 310, 320, 330, 340, 350 and/or 360. Although illustrated as discrete blocks, various blocks may be divided into additional blocks, combined into fewer blocks, or eliminated, depending on the desired implementation. Processing may begin at block 310.

At block 310, mobile operating server 110 may determine a first location of end device 140. By way of example, but not limitation, mobile operating server 110 may determine the first location of end device 140 by detecting global positioning system (GPS) information of end device 140 or using a 3G/4G network's position locating method. Processing may proceed to block 320.

At block 320, mobile operating server 110 may determine first access point 120 to provide a wireless local area network around the first location of end device 140. Processing may proceed to block 330.

At block 330, mobile operating server 110 may instruct first access point 120 around the first location of end device 140 to provide end device 140 with a first private wireless local area network. Then, first access point 120 may provide end device 140 with the first private wireless local area network on the receipt of the instruction generated by mobile operating server 110. By way of example, but not limitation, first access point 120 may assign some bandwidths of the wireless local area network as the first private wireless local area network for end device 140. The first private wireless local area network may have a network identifier such as a unique service set identifier (SSID). The unique SSID of the first private wireless local area network may be provided to end device 140. If end device 140 moves out from the first location, mobile operating server 110 may instruct first access point 120 to terminate the first private wireless local area network. Processing may proceed to block 340.

At block 340, mobile operating server 110 may determine a second location of end device 140. Processing may begin at block 350.

At block 350, mobile operating server 110 may determine second access point 130 to provide end device 140 with a wireless local area network around the second location of end device 140. Processing may proceed to block 360.

At block 360, mobile operating server 110 may instruct second access point 130 around the second location of end device 140 to provide end device 140 with a second private wireless local area network. Then, second access point 130 may provide end device 140 with the second private wireless local area network on the receipt of the instruction generated by mobile operating server 110. By way of example, but not limitation, second access point 130 may assign some bandwidths of the wireless local area network as the second private wireless local area network for end device 140. The second private wireless local area network may have a network identifier such as a unique service set identifier (SSID). In some embodiments, the unique SSID of the second private wireless local area network may be same with that of the first private wireless local area network. The unique SSID of the second private wireless local area network may be provided to end device 140.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 4:
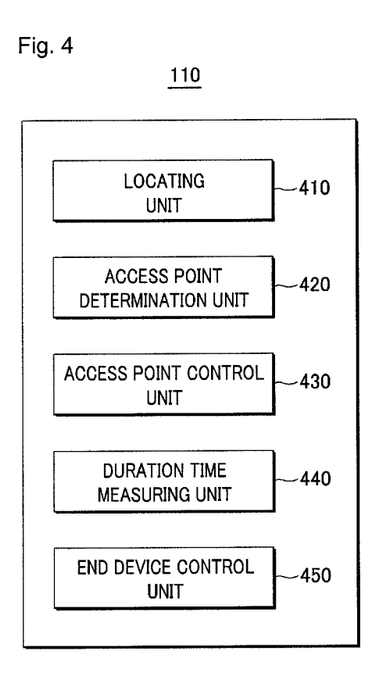
FIG. 4 shows a schematic block diagram illustrating an example architecture for a mobile operating server, arranged in accordance with at least some embodiments described herein.

FIG. 4 shows a schematic block diagram illustrating an example architecture for a mobile operating server, arranged in accordance with at least some embodiments described herein. As depicted in FIG. 4, mobile operating server 110 may include a locating unit 410, an access point determination unit 420, an access point control unit 430, a duration time measuring unit 440 and an end device control unit 450. Although illustrated as discrete components, various components may be divided into additional components, combined into fewer components, or eliminated altogether while being contemplated within the scope of the disclosed subject matter.

Locating unit 410 may be configured to determine a first location of end device 140. Further, locating unit 410 may be configured to determine a second location of end device 140 when end device 140 moves from the first location to the second location.

Access point determination unit 420 may be configured to determine an access point to provide end device 140 with a wireless local area network around the location of end device 140. In some embodiments, access point determination unit 420 may determine first access point 120 to provide a wireless local area network around the first location of end device 140. Further, access point determination unit 420 may determine second access point 130 to provide end device 140 with a wireless local area network around the second location of end device 140 when end device 140 moves to the second location.

Access point control unit 430 may be configured to instruct the access point around the location of end device 140 to provide end device 140 with a private wireless local area network. In some embodiments, access point control unit 430 may instruct first access point 120 to provide end device 140 with a first private wireless local area network.

Further, when end device 140 moves from the first location to the second location, access point control unit 430 may instruct first access point 120 to terminate the first private wireless local area network. Then, access point control unit 430 may instruct second access point 130 to provide end device 140 with a second private wireless local area network.

Duration time measuring unit 440 may be configured to measure a first duration time for which end device 140 is located around first access point 120 and a second duration time for which end device 140 is located around second access point 130. Access point control unit 430 may instruct first access point 120 and second access point 130 to provide end device 140 with the first private wireless local area network and the second private wireless local area network, respectively based on the first duration time and the second duration time. By way of example, but not limitation, if the first duration time is shorter than a predetermined time, access point control unit 430 may not instruct first access point 120 to provide end device 140 with the first private wireless local area network.

End device control unit 450 may be configured to instruct end device 140 to connect to the first private wireless local area network provided by first access point 120. Further, end device control unit 450 may be configured to instruct end device 140 to connect to the second private wireless local area network provided by second access point 130. The first private wireless local area network and the second private wireless local area network may have a same network identifier such as a unique service set identifier (SSID). The unique SSID of the first and second private wireless local area network may be provided to end device 140.

Figure 5:
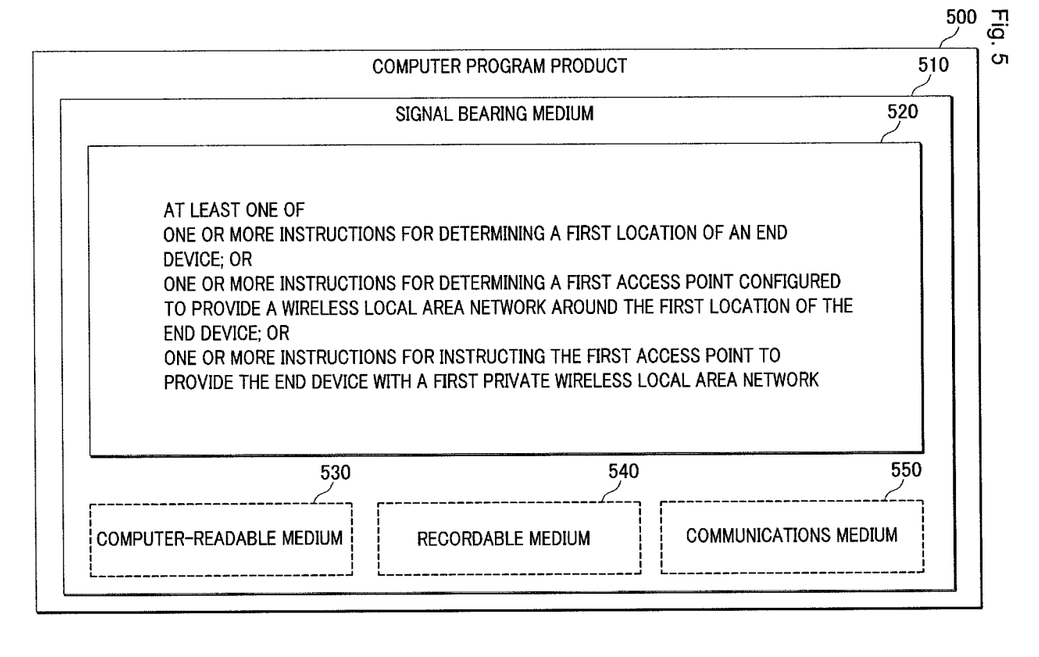
FIG. 5 illustrates computer program products that may be utilized to provide a scheme for providing private wireless local area networks, arranged in accordance with at least some embodiments described herein.

FIG. 5 illustrates computer program products 500 that may be utilized to provide a scheme for providing private wireless local area networks, arranged in accordance with at least some embodiments described herein. Program product 500 may include a signal bearing medium 510. Signal bearing medium 510 may include one or more instructions 520 that, when executed by, for example, a processor, may provide the functionality described above with respect to FIGS. 1A-4. By way of example, instructions 520 may include: one or more instructions for determining a first location of an end device; one or more instructions for determining a first access point configured to provide a wireless local area network around the first location of the end device; and one or more instructions for instructing the first access point to provide the end device with a first private wireless local area network. Thus, for example, referring to FIG. 2, mobile operating server 110 may undertake one or more of the blocks shown in FIG. 2 in response to instructions 520.

Further, by way of example, instructions 520 may include: one or more instructions for determining a first location of an end device; one or more instructions for determining a first access point configured to provide a wireless local area network around the first location of the end device; one or more instructions for instructing the first access point to provide the end device with a first private wireless local area network; one or more instructions for determining a second location of the end device; one or more instructions for determining a second access point configured to provide a wireless local area network around the second location of the end device; and one or more instructions for instructing the second access point to provide the end device with a second private wireless local area network. Thus, for example, referring to FIG. 3, mobile operating server 110 may undertake one or more of the blocks shown in FIG. 3 in response to instructions 520.

In some implementations, signal bearing medium 510 may encompass a computer-readable medium 530, such as, but not limited to, a hard disk drive, a CD, a DVD, a digital tape, memory, etc. In some implementations, signal bearing medium 510 may encompass a recordable medium 540, such as, but not limited to, memory, read/write (R/W) CDs, R/W DVDs, etc. In some implementations, signal bearing medium 510 may encompass a communications medium 550, such as, but not limited to, a digital and/or an analog communication medium (e.g., a fiber optic cable, a waveguide, a wired communications link, a wireless communication link, etc.). Thus, for example, program product 500 may be conveyed to one or more modules of mobile operating server 110 by an RF signal bearing medium 520, where the signal bearing medium 520 is conveyed by a wireless communications medium 550 (e.g., a wireless communications medium conforming with the IEEE 802.11 standard).

Figure 6:
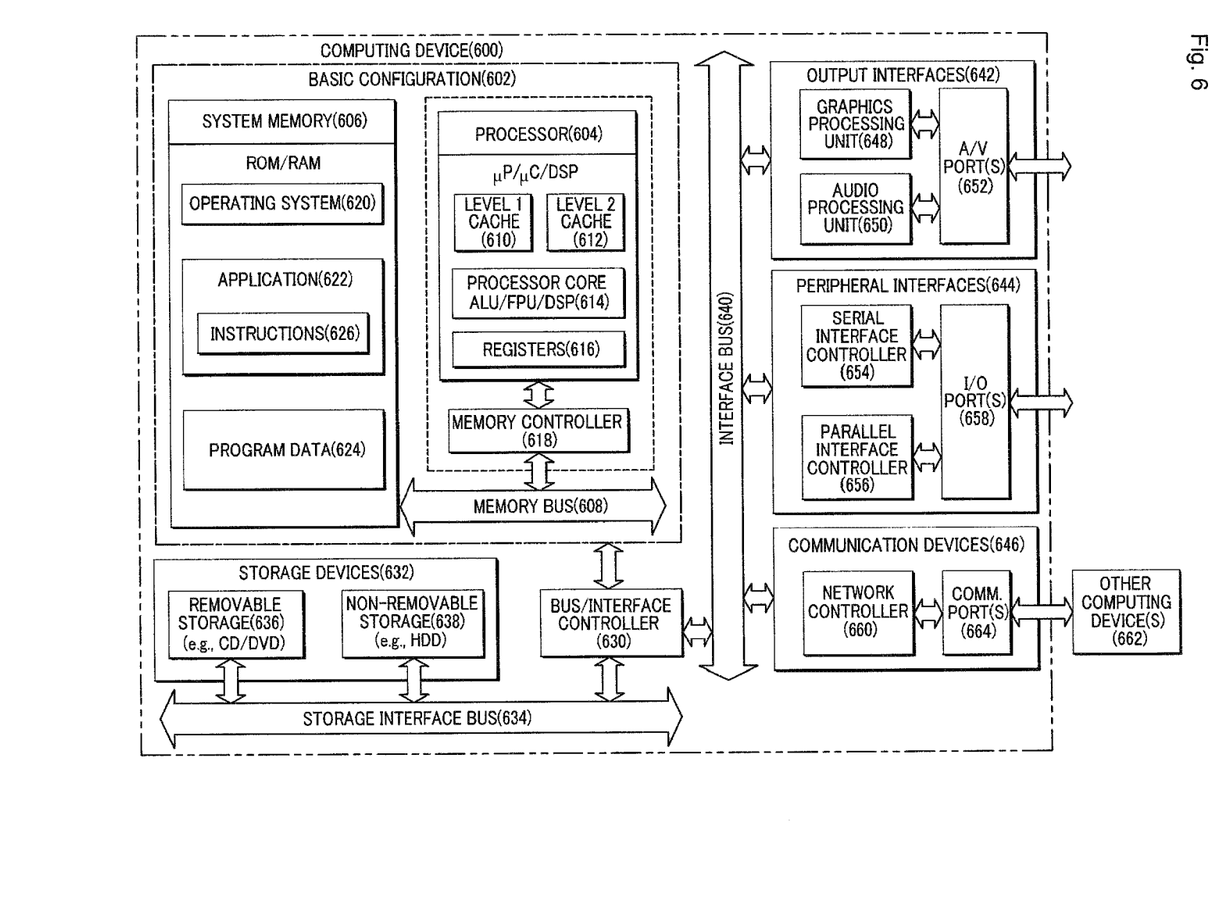
FIG. 6 is a block diagram illustrating an example computing device that may be utilized to provide a scheme for providing private wireless local area networks, arranged in accordance with at least some embodiments described herein.

FIG. 6 is a block diagram illustrating an example computing device 600 that may be utilized to provide a scheme for providing private wireless local area networks, arranged in accordance with at least some embodiments described herein. In these examples, elements of computing device 600 may be arranged or configured for a mobile operating server or a mobile device. In a very basic configuration 602, computing device 600 typically includes one or more processors 604 and a system memory 606. A memory bus 608 may be used for communicating between processor 604 and system memory 606.

Depending on the desired configuration, processor 604 may be of any type including but not limited to a microprocessor (μP), a microcontroller (μC), a digital signal processor (DSP), or any combination thereof. Processor 604 may include one more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A method performed under control of a mobile operating server, comprising:
    determining a first location of an end device;
    determining a first access point configured to provide a wireless local area network around the first location of the end device;
    instructing the first access point to provide the end device with a first private wireless local area network;
    measuring a first duration time for which the end device is located around the first access point;
    determining that the first duration time exceeds a predetermined amount of time,
    wherein the instructing the first access point to provide the end device with the first private wireless local area network is based on the determining that the first duration time exceeds the predetermined amount of time;
    determining a second location of the end device;
    determining a second access point configured to provide a wireless local area network around the second location of the end device; and
    instructing the second access point to provide the end device with a second private wireless local area network,
    wherein a network identifier of the first private wireless local area network is same with that of the second private wireless local area network.

2. The method of claim 1, further comprising: instructing the end device to connect to the first private wireless local area network provided by the first access point.

3. The method of claim 1, wherein the end device includes information for connecting to the first private wireless local area network provided by the first access point.

4. The method of claim 1, further comprising: instructing the first access point to terminate the first private wireless local area network when the end device moves out of the first location.

5. The method of claim 1, further comprising:
    measuring a second duration time for which the end device is located around the second access point, and
    wherein the instructing the second access point is based on the second duration time.

6. The method of claim 1, wherein the network identifier includes a service set identifier.

7. The method of claim 1, wherein the network identifier is provided to the end device.

8. The method of claim 1, wherein the first access point and the second access point are respectively controllable by the mobile operating server.

9. The method of claim 1, wherein the first access point and the second access point respectively include a Wi-Fi access point, the wireless local area network provided by the first access point and the wireless local area network provided by the second access point respectively include a Wi-Fi network, and the first private wireless local area network and the second private wireless local area network respectively include a Wi-Fi network.

10. A mobile operating server, comprising:
    a locating unit configured to determine a first location of an end device;
    an access point determination unit configured to determine a first access point configured to provide a wireless local area network around the first access point of the end device;
    an access point control unit configured to instruct the first access point to provide the end device with a first private wireless local area network; and
    a duration time measuring unit configured to measure a first duration time for which the end device is located around the first access point and to determine that the first duration time exceeds a predetermined amount of time,
    wherein the access point control unit is configured to instruct the first access point to provide the end device with the first private wireless local area network based on the determination that the first duration time exceeds the predetermined amount of time,
    wherein the locating unit is configured to determine a second location of the end device, the access point determination unit is configured to determine a second access point configured to provide a wireless local area network around the second location of the end device, and the access point control unit is configured to instruct the second access point to provide the end device with a second private wireless local area network, and
    wherein a network identifier of the first private wireless local area network is same with that of the second private wireless local area network.

11. The mobile operating server of claim 10, further comprising: an end device control unit configured to instruct the end device to connect to the first private wireless local area network provided by the first access point.

12. The mobile operating server of claim 10, wherein the end device includes information for connecting to the first private wireless local area network provided by the first access point.

13. The mobile operating server of claim 10, wherein the access point control unit is configured to instruct the first access point to terminate the first private wireless local area network when the end device moves out of the first location.

14. The mobile operating server of claim 10, wherein the duration time measuring unit is configured to measure a second duration time for which the end device is located around the second access point, and the access point control unit instructs the second access point to provide the end device with the second private wireless local area network based on the second duration time.

15. The mobile operating server of claim 10, wherein the network identifier includes a service set identifier.

16. The mobile operating server of claim 15, wherein the network identifier is provided to the end device.

17. The mobile operating server of claim 10, wherein the first access point and the second access point are respectively controllable by the mobile operating server.

18. The mobile operating server of claim 10, wherein the first access point and the second access point respectively include a Wi-Fi access point, the wireless local area network provided by the first access point and the wireless local area network provided by the second access point respectively include a Wi-Fi network, and the first private wireless local area network and the second private wireless local area network respectively include a Wi-Fi network.

19. A non-transitory computer-readable storage medium having stored thereon computer-executable instructions that, in response to execution, cause a mobile operating server to perform operations, comprising:
determining a first location of an end device;
determining a first access point configured to provide a wireless local area network around the first location of the end device;
instructing the first access point to provide the end device with a first private wireless local area network;
measuring a first duration time for which the end device is located around the first access point;
determining that the first duration time exceeds a predetermined amount of time,
wherein the instructing the first access point to provide the end device with the first private wireless local area network is based on the determining that the first duration time exceeds the predetermined amount of time;
determining a second location of the end device;
determining a second access point configured to provide a wireless local area network around the second location of the end device; and
instructing the second access point to provide the end device with a second private wireless local area network,
wherein a network identifier of the first private wireless local area network is same with that of the second private wireless local area network.

20. The non-transitory computer-readable storage medium of claim 19, wherein the operations further comprising:
measuring a second duration time for which the end device is located around the second access point, and
wherein the instructing the second access point is based on the second duration time.

21. The non-transitory computer-readable storage medium of claim 19, wherein the first access point and the second access point respectively include a Wi-Fi access point, the wireless local area network provided by the first access point and the wireless local area network provided by the second access point respectively include a Wi-Fi network, and the first private wireless local area network and the second private wireless local area network respectively include a Wi-Fi network.

22. A method performed under control of a mobile operating server, comprising:
determining a first location of an end device;
determining a first access point configured to provide a wireless local area network around the first location of the end device;
instructing the first access point to provide the end device with a first private wireless local area network;
measuring a speed at which the end device moves around the first access point,
wherein the instructing the first access point to provide the end device with the first private wireless local area network is based on the speed;
determining a second location of the end device;
determining a second access point configured to provide a wireless local area network around the second location of the end device; and
instructing the second access point to provide the end device with a second private wireless local area network,
wherein a network identifier of the first private wireless local area network is same with that of the second private wireless local area network.

23. The method of claim 22, further comprising:
determining that the speed at which the end device moves around the first access point is less than a predetermined speed,
wherein the instructing the first access point is based on the determining that the speed at which the end device moves around the first access point is less than the predetermined speed.

* * * * *

UNITED STATES PATENT AND TRADEMARK OFFICE
CERTIFICATE OF CORRECTION

| | | |
|---|---|---|
| PATENT NO. | : 8,885,570 B2 | Page 1 of 1 |
| APPLICATION NO. | : 13/995840 | |
| DATED | : November 11, 2014 | |
| INVENTOR(S) | : Lee | |

It is certified that error appears in the above-identified patent and that said Letters Patent is hereby corrected as shown below:

On the Title Page 2, Item (56), under "OTHER PUBLICATIONS", in Column 2, Line 1, delete "Qualcom" and insert -- Qualcomm --, therefor.

In the Specification

In Column 1, Below "Title", line 3, insert -- CROSS-REFERENCE TO RELATED APPLICATION The present application is a U.S. national stage filing under 35 U.S.C. §371 of International Application No. PCT/KR2012/005487, filed on Jul. 11, 2012, the entire contents of which are incorporated herein by reference. --, therefor.

Signed and Sealed this
Ninth Day of June, 2015

Michelle K. Lee
*Director of the United States Patent and Trademark Office*